(12) United States Patent
Nako

(10) Patent No.: US 7,072,527 B1
(45) Date of Patent: Jul. 4, 2006

(54) IMAGE CORRECTION APPARATUS

(75) Inventor: Kazuyuki Nako, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/720,704

(22) PCT Filed: Jun. 16, 1999

(86) PCT No.: PCT/JP99/03199

§ 371 (c)(1),
(2), (4) Date: Dec. 29, 2000

(87) PCT Pub. No.: WO00/00930

PCT Pub. Date: Jan. 6, 2000

(30) Foreign Application Priority Data

Jun. 30, 1998 (JP) .......................... P10-183463

(51) Int. Cl.
*G06K 9/96* (2006.01)

(52) U.S. Cl. ...................... 382/290; 358/474
(58) Field of Classification Search ......... 358/473–474, 358/486, 449, 464, 466; 382/284–290, 293
See application file for complete search history.

(56) References Cited

U.S. PATENT DOCUMENTS

| | | | | |
|---|---|---|---|---|
| 5,276,530 A | * | 1/1994 | Siegel | 358/406 |
| 5,416,609 A | * | 5/1995 | Matsuda et al. | 358/474 |
| 5,497,236 A | * | 3/1996 | Wolff et al. | 358/296 |
| 5,585,926 A | * | 12/1996 | Fujii et al. | 358/471 |
| 5,616,914 A | | 4/1997 | Matsuda | |
| 5,659,404 A | * | 8/1997 | Matsuda | 358/474 |
| 5,760,925 A | * | 6/1998 | Saund et al. | 358/497 |
| 5,764,383 A | * | 6/1998 | Saund et al. | 358/497 |
| 5,774,237 A | | 6/1998 | Nako | 358/471 |
| 5,808,756 A | * | 9/1998 | Matsuda | 358/474 |
| 5,831,750 A | * | 11/1998 | Okisu et al. | 358/493 |
| 5,834,762 A | | 11/1998 | Matsuda et al. | 250/208 |
| 5,835,241 A | * | 11/1998 | Saund | 358/488 |
| 5,848,197 A | * | 12/1998 | Ebihara | 382/275 |
| 5,940,544 A | | 8/1999 | Nako | 382/293 |
| 6,345,763 B1 | * | 2/2002 | Matsuda et al. | 235/459 |
| 6,385,347 B1 | * | 5/2002 | Matsuda | 382/263 |

FOREIGN PATENT DOCUMENTS

| | | |
|---|---|---|
| JP | A 57-191653 | 11/1982 |
| JP | A 61-125282 | 6/1986 |
| JP | A 2-308269 | 12/1990 |
| JP | A 5-161004 | 6/1993 |
| JP | A 6-168324 | 6/1994 |
| JP | A 6-217090 | 8/1994 |

(Continued)

OTHER PUBLICATIONS

Notification of Reason for Refusal (No translation) regarding Japanese patent application No. 10–183463 corresponding to present application.
Copy of International Preliminary Examination Report
Copy of International Search Report (Japanese Patent Office).

*Primary Examiner*—Jingge Wu
(74) *Attorney, Agent, or Firm*—David C. Conlin; David A. Tucker; Edwards & Angell, LLP

(57) ABSTRACT

An image correction apparatus 1 includes an image input device 3, a memory device 4, a central processing unit 2, and and image output device 5. In the image correction apparatus 1, a locally wrinkled document or a document with a binding portion lifted differently between the top and bottom of the document is read from the image input device 3 and, using a program which is run on the central processing unit 2, an input image is corrected for the geometric distortion and luminance variations caused due to the upper and lower sides of the document making a slope with respect to a document platen, and thereby, a flat document image is restored.

16 Claims, 14 Drawing Sheets

FOREIGN PATENT DOCUMENTS

| | | |
|---|---|---|
| JP | A 7-38712 | 2/1995 |
| JP | 7254969 | 10/1995 |
| JP | A 8-181828 | 7/1996 |
| JP | A 8-237485 | 9/1996 |
| JP | 9284491 | 10/1997 |
| JP | A 10-65877 | 3/1998 |
| JP | A 10-173905 | 6/1998 |

\* cited by examiner

IMAGE CORRECTION APPARATUS

TECHNICAL FIELD

The present invention relates to an image correction apparatus, and more particularly to an image correction apparatus which reads as an image a document having a locally distorted portion such as a portion in the vicinity of the binding edge of a book, and corrects the image as if the original document were flat.

BACKGROUND ART

Japanese Unexamined Patent Publication JP-A 57-191653 (1982) discloses an image forming apparatus as one example of an apparatus that produces clear copies at unity magnification of a document, such as a bound book or notebook, whose center binding portion, when placed on a document platen, is separated from the document platen. This image forming apparatus corrects image distortion and brightness by measuring the distance between the document and the document platen and by adjusting the scan speed, the height of the document platen, and the luminance of the light source in accordance with the measured distance; when a straight line along the center binding is taken as the y axis and the direction of a double page spread as the x axis, the image forming apparatus provides an effective method, provided that the document platen and the document do not form any slope angles along the y-axis direction, but form a constant slope angle $\theta$ only along the x-axis direction.

A technique for accomplishing image correction on the basis of the input image alone is disclosed in Japanese Unexamined Patent Publication JP-A 5-161004 (1993) in relation to a document reading apparatus. In this document reading apparatus, a document is read by a document reading means to obtain image information, and the boundary between the document and the document platen is detected by a boundary detection means. Based on the result of the boundary detection, the shape and the curvature of the document are detected, and the captured image data is corrected on the basis of the result of the detection. Further, in this document reading apparatus, the color of the document platen is chosen to be non-white color such as black for easy distinction between a document and the document platen, and the apparatus is applicable where the difference of height between both edges of the document is smaller than a certain value.

Further, according to an image processing apparatus disclosed in Japanese Unexamined Patent Publication JP-A 8-181828 (1996), the constraints imposed on the color of the document platen or the document color, which has been the problem with image reading apparatuses such as one disclosed in JP-A 5-161004, are alleviated by providing a document guide with a black and white stripe pattern on the surface that contacts the document.

On the other hand, Japanese Unexamined Patent Publication JP-A 10-65877 (1998) discloses, in relation to an image processing apparatus described therein, a technique for detecting an edge in an image captured from a document, and for correcting the document for height and rotational distortions by detecting document skew from the obtained edge.

However, the image forming apparatus disclosed in JP-A 57-191653 has had the problem that it requires the provision of a very complex mechanism, since the scan speed, the height of the document platen, and the luminance of the light source have to be limited while reading an image.

Furthermore, since results obtained by distance measuring means generally contain errors, there has been the problem that the result of the measurement does not agree with the actual distance between the document and the document platen and, as a result, the captured image cannot always be corrected so that it appears flat.

In the document reading apparatus disclosed in JP-A 5-161004, there is no need to detect the height of the document surface using distance measuring means such as a sensor as in the above-described image forming apparatus, and corrections for distortion and brightness are made on the basis of the image alone, but since the position of the boundary is uniquely associated with the document height, the document reading apparatus disclosed therein has had the problem that corrections cannot be made if the document is not placed in the specified position or if the document is placed by being rotated relative to that position.

A further problem has been that corrections cannot be made unless the document height is kept within a predetermined range along the main scanning direction of the reading means; only a warning is issued if the document height is not kept within the predetermined range along the main scanning direction of the reading means.

Further, with the prior art edge position detection method, as disclosed in JP-A 10-65877, if a connected component of an edge-detection filtered image is less than a predetermined value, it is judged to be an isolated point, and if the connected component is less than the predetermined value, interpolation is performed using a straight line; this method, however, has had the problem that edge detection errors and omissions of edge detection are liable to occur.

For the detection of the binding position, a method that judges a maximum or minimum point of the edge position to be the binding position has been used in the prior art, as disclosed in JP-A 10-65877. Therefore, this method has had the problem that if the document contains a localized irregularity such as a crease, such irregularity may be erroneously detected as the binding position.

As for the reference line slope, since the lower line of the document guide is used as the reference line as described, for example, in JP-A 8-181828, the prior art has had the problem that if the document guide is not provided, the reference line or the slope of the reference line cannot be obtained.

Furthermore, since end points of a document are detected using a criterion common to two facing pages, as described in JP-A 8-181828, there has been the problem that the end points of the left and right pages cannot be detected correctly in the case of an apparatus such as a scanner or a copying machine in which light is usually projected in an oblique direction.

Further, in any of the techniques disclosed in JP-A 57-191653, JP-A 5-161004, and JP-A 8-181828, since the document height is assumed to be constant along the main scanning direction of the reading means, there has been the problem that image correction cannot be accomplished if the amount of lift differs between the top and bottom of the document. A further problem has been that, if the amount of lift at top and bottom differs between the left and right pages, proper correction cannot be accomplished by maintaining an optimum balance between the left and right pages.

Further, in the prior art, image portions near the binding tend to darken, rendering the correction incomplete or impossible. Moreover, there has been the problem that when correcting for the binding portion, the correction is particularly difficult if the document color is not white.

The prior art has had the further problem that since the shape is identified directly from the captured high-resolution image, the processing speed is slow and a large amount of memory is used.

Furthermore, since image reading is performed using the same characteristics regardless of the need for image distortion correction, there has been the problem that if there is no need for distortion correction, the black/white contrast becomes too low, and if distortion correction is performed, edge detection becomes difficult.

The prior art has also had the problem that no automatic correction stop function is incorporated, resulting in wasteful paper output.

To solve the above-enumerated problems, it is an object of the present invention to provide an image correction apparatus that corrects an image for geometric distortion and brightness as if the original document were flat, even when the document is rotated or when the amount of lift at the binding differs between the top and bottom of the document.

DISCLOSURE OF INVENTION

To solve the above-outlined problems, the present invention provides an image correction apparatus comprising image input means, storage means, central processing means, and image output means, the image correction apparatus comprising side sloping image correction means for correcting an image of a document whose top and bottom sides make a slope with respect to a document platen.

The invention is characterized in that the side sloping image correction means includes edge detection means for detecting edges of the document; binding position detection means for obtaining a binding position of the document; reference line detection means for obtaining a reference line for the position of the document; document end point detection means for obtaining left and right end points of the document on the basis of variations in image luminance near the edges; side slope angle computing means for computing slope angles of the top and bottom sides of the document on the basis of the reference line and the binding position; three-dimensional edge position computing means for computing three-dimensional positions of upper and lower edges of the document on the basis of the edges and the slope angles; document shape computing means for computing a shape of a whole of the document on the basis of the three-dimensional positions of the edges; and luminance correction parameter computing means for obtaining background luminance of a correction target pixel from the image on the basis of the three-dimensional shape of the document and obtaining a luminance correction parameter for the pixel on the basis of the background luminance and target luminance, and an input image is corrected using the luminance correction parameter and the three-dimensional shape of the document.

The invention is characterized in that from an area where a change of edge position is small, the edge detection means detects segments longer than a predetermined length and, for any other portion than the detected segments, a position interpolated from segments detected before and after that portion is taken as a position of a document edge.

The invention is characterized in that of maximum or minimum points of positions of edges detected by the edge detection means, the binding position detection means detects those nearest to a center of the image as representing the binding position.

The invention is characterized in that of segments where a pixel value of an image near each edge is larger than a first reference value and where an amount of change of edge slope is smaller than a second reference value, the reference line detection means detects an average edge slope in the longest segment as a slope of the reference line, and takes a straight line, extended from an end point outside the document along the longest segment with the thus detected slope, as the reference line, the reference line being detected for each of the left and right edges or the upper and lower edges of the document.

The invention is characterized in that the document end point detection means detects the end points of the document, based on different criteria between the left and right pages of the document.

The invention is characterized in that the document shape computing means approximates a document surface by a set of straight lines connecting between the lower and upper edges, and obtains a three-dimensional position of the document surface on the basis of a dividing ratio in which the positions of upper and lower end points of the straight lines are divided.

The invention is characterized in that when computed edge lengths of the upper and lower edges differ from each other, the document shape computing means corrects the three-dimensional positions of the edges so that the lengths becomes equal to each other.

The invention is characterized in that when computed vertical lengths of the left and right pages differ from each other, the document shape computing means corrects three-dimensional shape data of the document so that the vertical lengths becomes equal to each other.

The invention is characterized in that the document shape computing means includes image reducing means for reducing an input image in accordance with a predetermined reduction ratio and, after obtaining the three-dimensional shape of the document from a reduced image, corrects the three-dimensional shape data of the document in accordance with the reduction ratio.

The invention is characterized in that the luminance correction parameter computing means obtains the background luminance of the correction target pixel on the basis of a dividing ratio of an image luminance near the upper and lower end points of the straight lines of claim 7 which are used to approximate the document surface, and takes the ratio of a target luminance to the background luminance as a luminance correction parameter.

The invention is characterized in that the side sloping image correction means converts a pixel value near the binding position to blank space, and outputs a converted pixel value to the image output means.

The invention is characterized in that the side sloping image correction means converts a pixel value near the binding position to a pixel value at a position distanced from the binding position, and outputs a converted pixel value to the image output means.

The invention is characterized in that the side sloping image correction means performs image reading for producing the reduced image separately from image reading for reading the correction target pixel.

The invention is characterized in that the image correction apparatus further comprises correction selecting means for making a selection as to whether image correction is applied or not, and image input means for inputting an image by using input characteristics which vary depending on whether image correction is carried out or not.

The invention is characterized in that the image correction apparatus further comprises document region detection means for detecting a document region from an input image, and when the document region runs over the image, image correction is not carried out.

BRIEF DESCRIPTION OF DRAWINGS

Other and further objects, features, and advantages of the invention will be more explicit from the following detailed description taken with reference to the accompanying drawings.

BEST MODE FOR CARRYING OUT THE INVENTION

Figure 1:
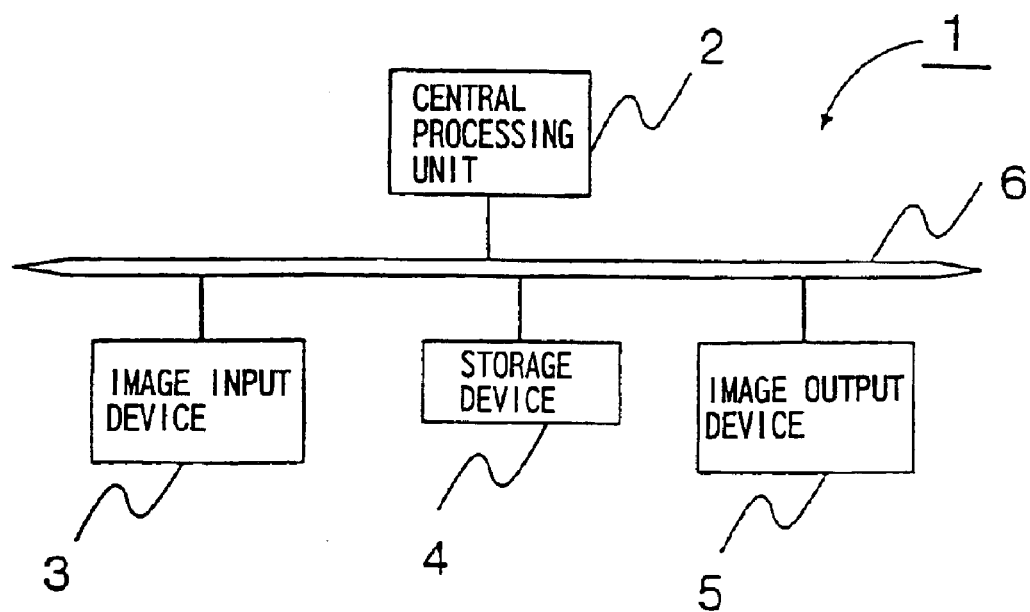
FIG. 1 is a block diagram showing the electrical configuration of an image correction apparatus 1 according to one embodiment of the present invention.

Now referring to the drawings, preferred embodiments of the invention are described below.

[Embodiment 1]

FIG. 1 is a block diagram showing the electrical configuration of an image correction apparatus 1 according to one embodiment of the present invention. The image correction apparatus 1 includes a central processing unit 2, an image input device 3, a storage device 4, and an image output device 5; these are interconnected by a bus line 6, and signals are given via the bus line 6. In the explanation hereinafter given, the description of the bus line will be omitted.

The image input device 3 as image input means is implemented, for example, by an image reading device such as a scanner. Alternatively, the image input device 3 may be implemented as a device for reading images prerecorded on a recording medium such as a CD-ROM (Compact Disk-Read Only Memory), a floppy disk, or an magneto optical disk.

The image output device 5 as image output means is implemented, for example, by a printer. Alternatively, the image output device 5 may be implemented by a display device such as a CRT (Cathord Ray Tube) or an LCD (Liquid Crystal Display).

The storage device 4 as storage means is implemented, for example, by a semiconductor memory or a hard disk device. An image input by the image input device 3 is stored in the storage device 4 in the form of an image signal. Each image processing means is implemented by a program, and prestored in the storage device 4.

The central processing unit 2 as central processing means is implemented, for example, by a microprocessor, and each of the image processing means hereinafter described is implemented as a program which is run on the central processing unit 2. In this embodiment, each image processing means is implemented as a program run on the central processing unit 2, but each means may be implemented in hardware logic.

Figure 2:
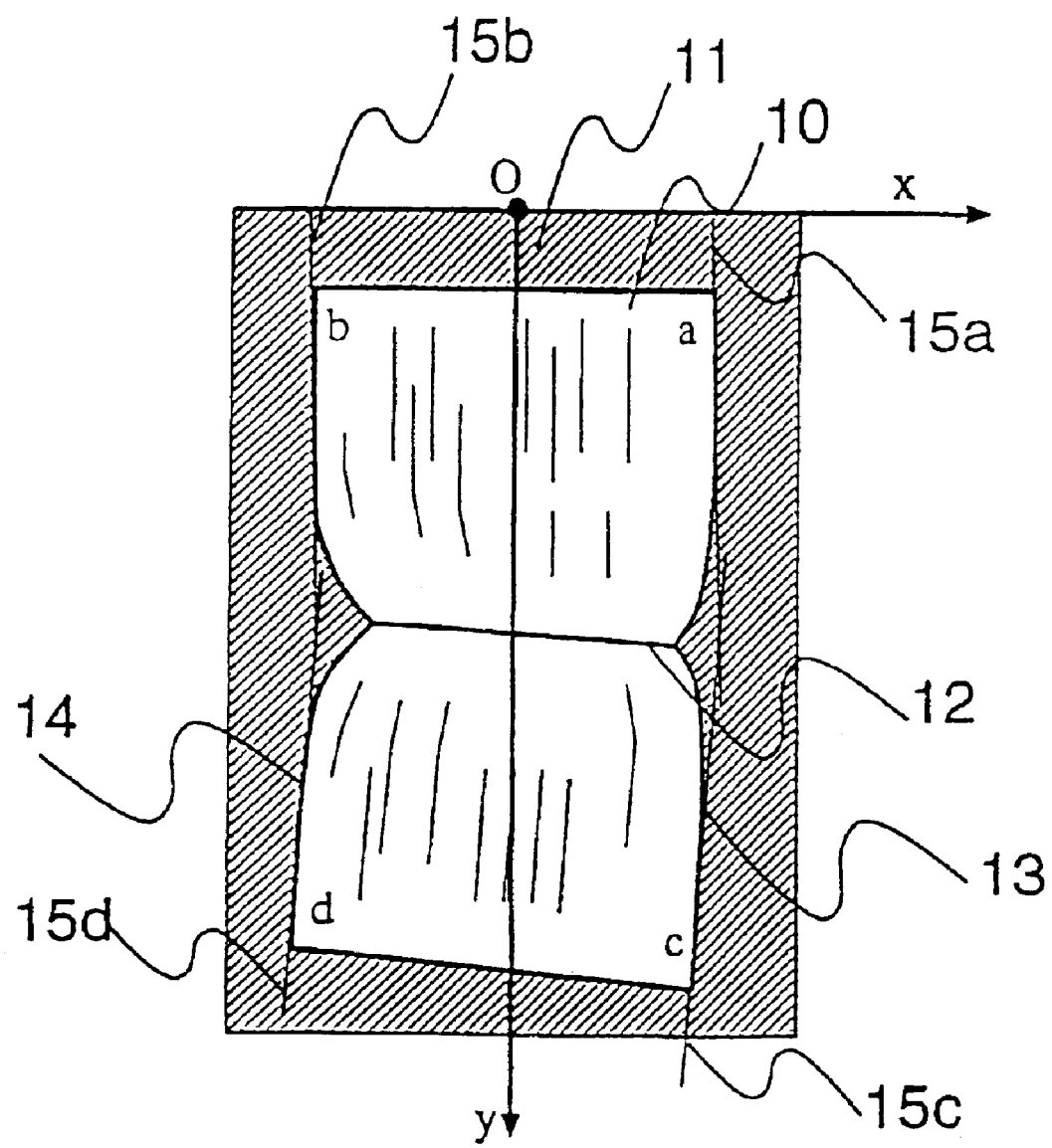
FIG. 2 is an example of an image read from a document 10 such as a book or a magazine.

FIG. 2 is an example of an image read from a document 10 such as a book or a magazine. Since the document surface is placed in intimate contact with the glass surface of the scanner, the distance between the document surface held in intimate contact with the glass surface and the lens of the scanner is constant, but in the vicinity of the binding 12, the document surface is lifted away from the glass surface, increasing the distance from the lens of the scanner and thus resulting in a reduction in image size when scanned. This causes geometric distortion in the vicinity of the binding 12. Furthermore, since the scanner illuminates the document surface with light and reads the reflected light, the image of the lifted portion such as the portion near the binding 12 becomes dark.

In the following description, the horizontal direction in FIG. 2 is taken as the x direction, and the vertical direction as the y direction. The origin O is aligned with the center of the lens, and set at the center of the top of the image. The main scanning direction of the scanner for reading the image is the direction parallel to the x axis, and the sub scanning direction is parallel to the y direction. This means that a CCD line sensor is parallel to the x axis, and that the moving direction of the lens and CCD is parallel to the y direction. It is assumed that the document 10 in the input image is placed by being rotated 90 degrees in the clockwise direction, and the page located in the upper part of the image will be referred to as the left page and the page in the lower part as the right page, while the portion "a" of the document 10 will be referred to as the document upper left, the portion "b" as the document lower left, the portion "c" as the document upper right, and the portion "d" as the document lower right. The contour of the document surface will be referred to as document edges, that is, the portion 13 in FIG. 2 will be referred to as the document upper edge and the portion 14 as the document lower edge. The portions of the document surface that contact the glass surface are flat, and the document edges in these portions, therefore, form straight lines. Tangent lines on the document edges in such portions are set as reference lines, that is, the reference line in the upper left portion of the document is set as a reference line 15a, the reference line in the lower left portion as a reference line 15b, the reference line in the upper right portion as a reference line 15c, and the reference line in the lower right portion as a reference line 15d.

It is also assumed that the image is read in such a manner that the document 10 can be distinguished from a non-document area 11 to enable the edges of the document 10 to be detected. In the case of an ordinary document with a white background, either the document is scanned with the scanner cover left open, or the scanner cover is painted black or other non-white color; the edges of the document 10 can then be detected since the non-document area 11, when scanned, appears darker than the document 10, producing a difference in luminance between the non-document area 11 and the document 10. On the other hand, in the case of a dark document, the scanner cover is painted white or other light color, and the image is scanned with the cover closed; in this case also, since there occurs a difference in luminance between the non-document area 11 and the document 10, the edges of the document 10 can be detected.

Each image processing means will be described in detail below. The following description is given by dealing with an image projected through the lens, not the actual document, unless specifically stated otherwise. The reason for this is that the actual document and its image are geometrically similar, the only difference being in size and no difference in shape, and since the image projected on the CCD is the cross section on the CCD plane of the document image projected through the lens, the shape of the document image can be calculated on the same scale as the projected image, which facilitates understanding.

Edge-detection means is implemented using, for example, an edge detection filter. A variety of edge detection filters, such as the Sobel operators and Prewitt operators, have been proposed in the art. These edge detection filters output larger values for areas where the image luminance changes sharply. When the luminance of the document surface differs from the luminance of the non-document area, the edges of the document can be detected by processing the image using an edge detection filter, but since edges other than the document edges, such as contours of letters, are also detected, the following provisions are made so that only the document edges can be detected. Here, the document edges refer to the outermost contour lines of the document surface.

Figure 3:
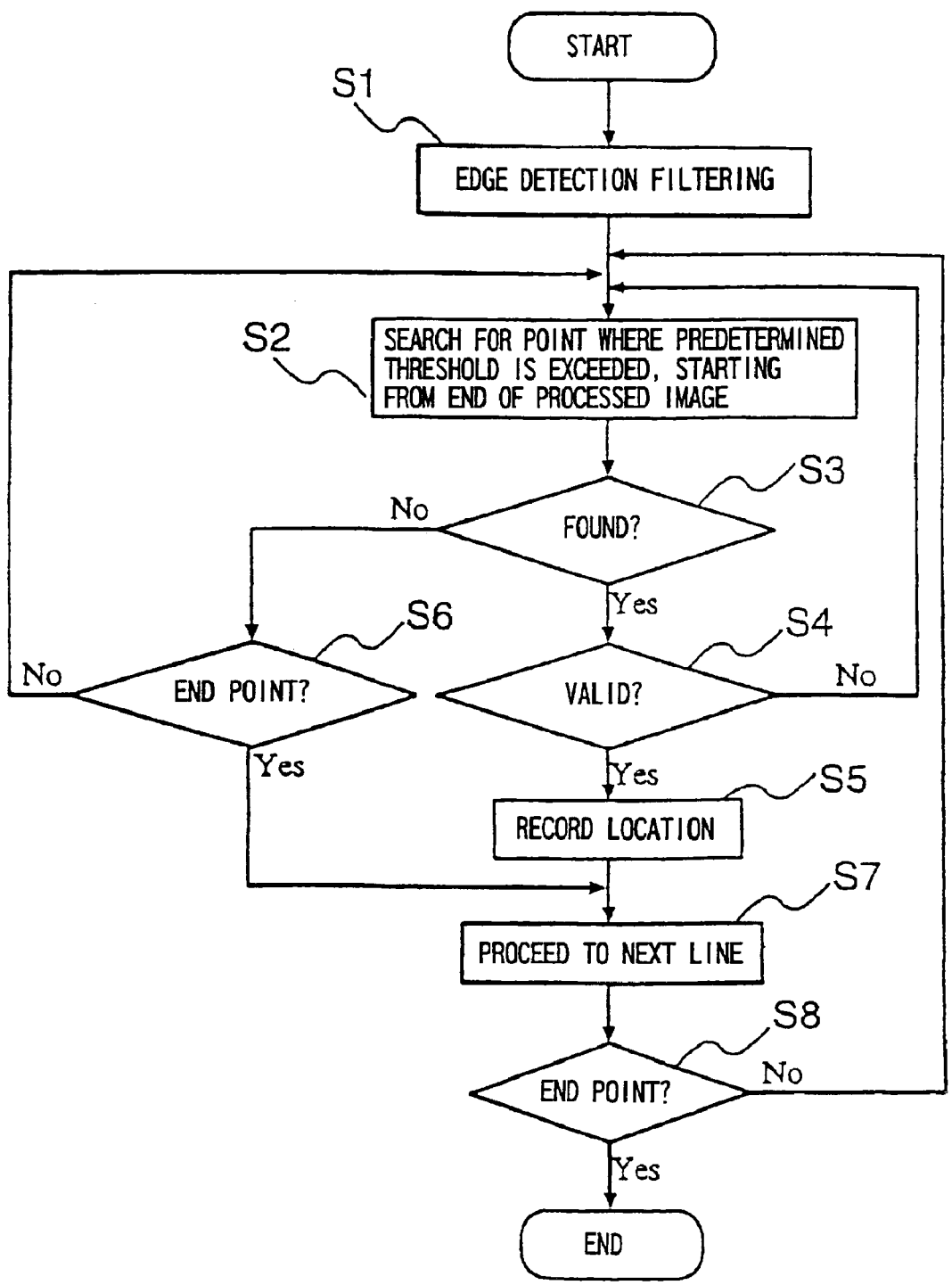
FIG. 3 is a flow chart illustrating an edge detection procedure.

FIG. 3 is a flow chart illustrating an edge detection procedure. First, edge detection is performed using an edge detection filter (S1); then, starting from an end of the edge-detection filtered image and proceeding in the x direction, a search is made for a point (edge) at which a predetermined threshold is exceeded (S2). If such a point is found (S3), the validity of the edge is checked (S4); if it is valid, the location is recorded (S5), and the process moves on to the next line (S7). If the end point of the search range is reached without finding any edge, the process proceeds to the next line without recording any location. When the final line is reached (S8), the process is terminated.

In the validity check, it is verified, for example, that the point is not an isolated point, and that there are no edges over a given distance inside the document. If the edge detected by filtering is an isolated point, it may be a dirt or dust particle adhering to the glass surface of the scanner or may be noise; therefore, such an edge is eliminated. To determine whether the edge is an isolated point or not, the connected component of pixels in the filtered image is examined, and if the number of connected pixels is less than a predetermined value, the edge is judged to be an isolated point. Further, the document side faces, the cover, etc. reflected in the image will also be detected as edges by the edge detection filter, but assuming that there are blank spaces at the upper and lower ends of the document surface, it can be considered that no edges would exist over some distance inside the edge of the document surface. From this, if no other edge exists over a given distance from the detected edge toward the inside of the document, the detected edge can be judged to be an edge of the document.

Figure 4:
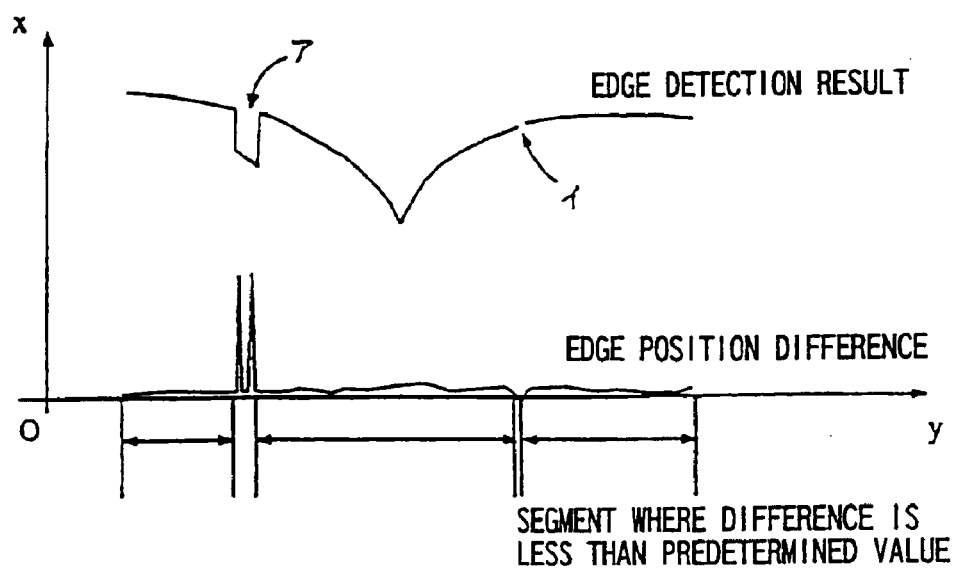
FIG. 4 is a graph showing edge detection results and absolute differences between preceding and succeeding edge positions.

FIG. 4 shows edge detection results and absolute differences between preceding and succeeding edge positions. When edge detection is performed in accordance with FIG. 3, the result may contain an edge detection error or an edge detection omission. These correspond to the portions indicated by "a" and "i" in FIG. 4. To detect the portions "a" and "i" in FIG. 4, first the absolute difference between the preceding and succeeding edge positions is calculated. In a portion where the document edge was correctly detected, the absolute difference is small because the change of edge is small, but in a portion where an erroneous edge detection was made, the difference value increases before and after that portion. An omission of edge detection can be detected because edge detection data is missing before and after that. Accordingly, any segment where the absolute difference is less than a predetermined value, and where the edge detection result exists, is judged to reflect the correct edge detection result. However, segments shorter than a predetermined length are ignored in order to avoid edge detection errors. Segments other than the above segments are interpolated from the data of the preceding and succeeding segments. The interpolation can be made using a straight line or a Bezier curve or the like.

By performing the above processing on both the top and bottom of the document, the upper an lower edges of the document can be detected.

Figure 5:
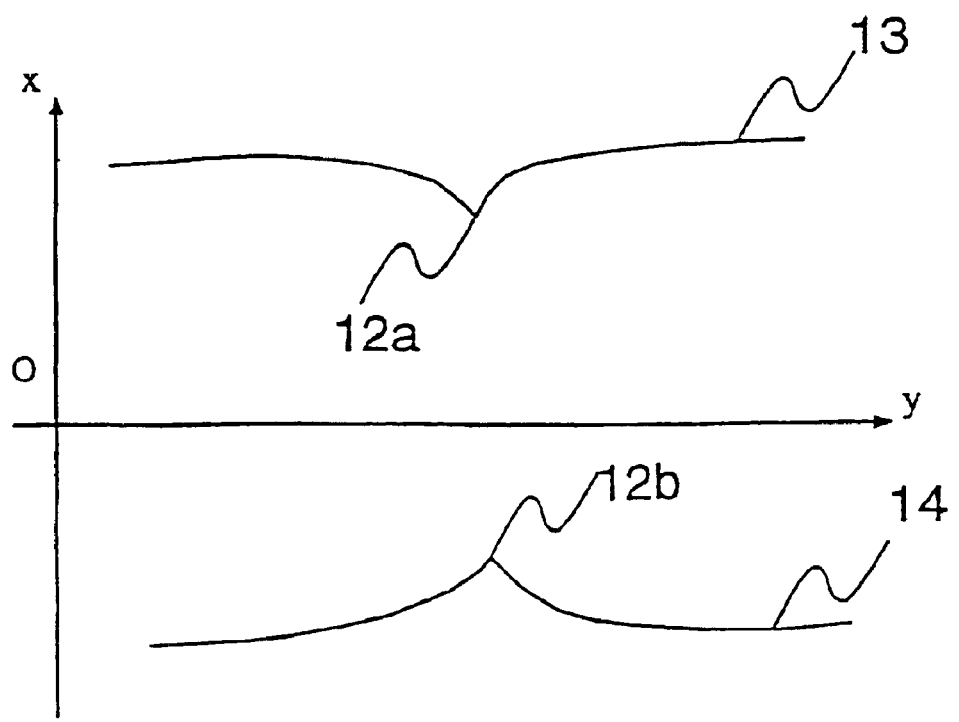
FIG. 5 is a diagram for explaining binding position detection means.

Next, binding position detection means will be described with reference to FIG. 5. Upper and lower end points 12a and 12b of the binding 12 are found from the upper edge 13 and the lower edge 14 obtained by the edge detection means. A minimum point of the upper edge 13 is taken as the upper end point 12a of the binding, and a maximum point of the lower edge 14 is taken as the lower end point 12b of the binding. At this point, since there may exist maximum and minimum points that are irrelevant to the binding, the maximum and minimum points nearest to the center line are taken to determine the binding position.

Once the upper and lower end points of the binding are found as described above, the line joining them is taken as the binding 12. Next, reference line detection means will be described with reference to FIG. 6. In portions where the document surface contacts the glass surface, there is no distortion and, therefore, the document edges are straight lines. Using these lines as reference lines, the shape of the document is computed from the positional relationship between the reference lines and the edges in the image processing hereinafter described.

Figure 6:
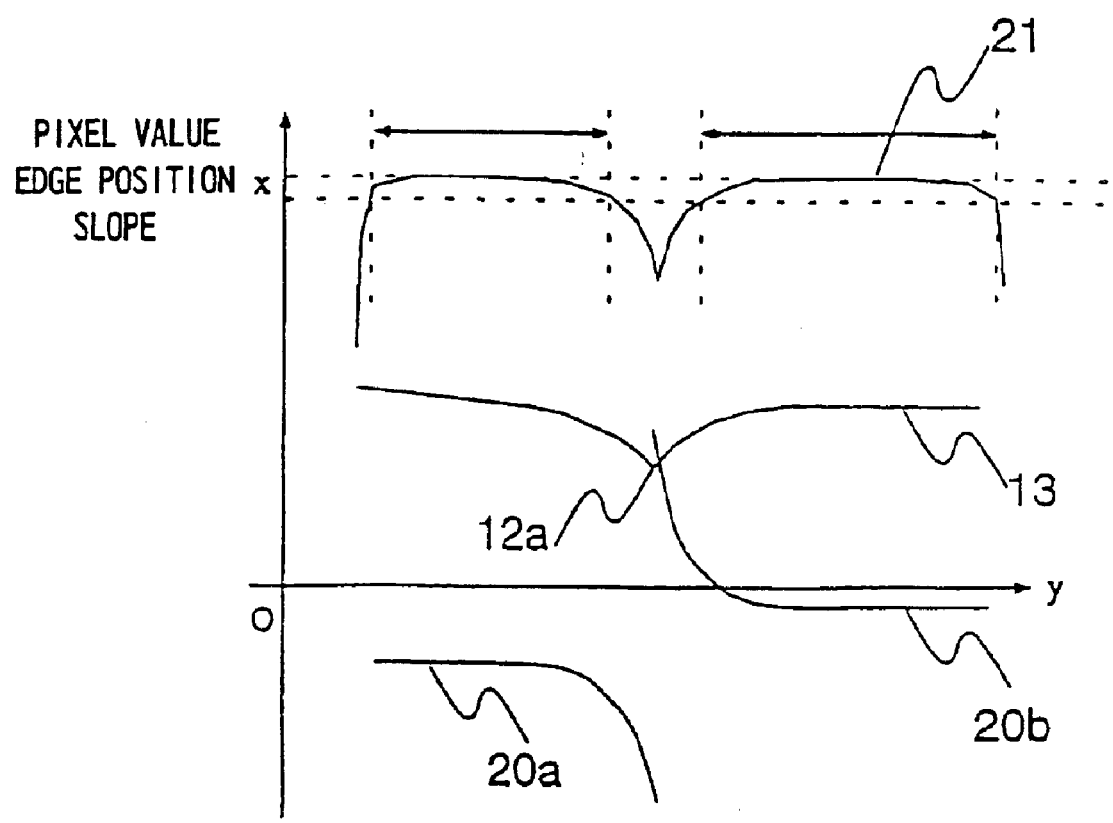
FIG. 6 is a diagram for explaining reference line detection means.

In FIG. 6, reference numeral 20a represents the slope of the edge in the upper part of the left page, and 20b the slope of the edge in the upper part of the right page. Further, reference numeral 21 shows the change of the pixel value near the edge in the upper part of the document. The pixel value near the edge may be represented by the value of a pixel located at a given distance from the edge or by the average value of pixels in the vicinity of it. In a portion where the document is separated from the glass surface, the pixel value decreases since the image darkens. Therefore, any portion where the pixel value is within a predetermined range relative to the maximum value of the pixel value can be judged to be a portion contacting the glass surface. Within this range, positions are detected where the edge slopes 20*a* and 20*b* remain substantially constant, and the obtained values are taken as representing the slopes of the respective reference lines. Straight lines having the thus determined slopes, and passing through the respective edge positions in a segment where the document contacts the glass surface, are set as the reference lines. Each passing point may be set at any point in the segment judged to be contacting the glass surface, but a point near the center of the segment is preferable since end portions of the segment are where the edge begins to curve and the edge is not necessarily a straight line.

By performing the same processing on the lower part of the document, the reference lines 15*a*, 15*b*, 15*c*, and 15*d* for the upper and lower edges of the document can be obtained.

Figure 7:
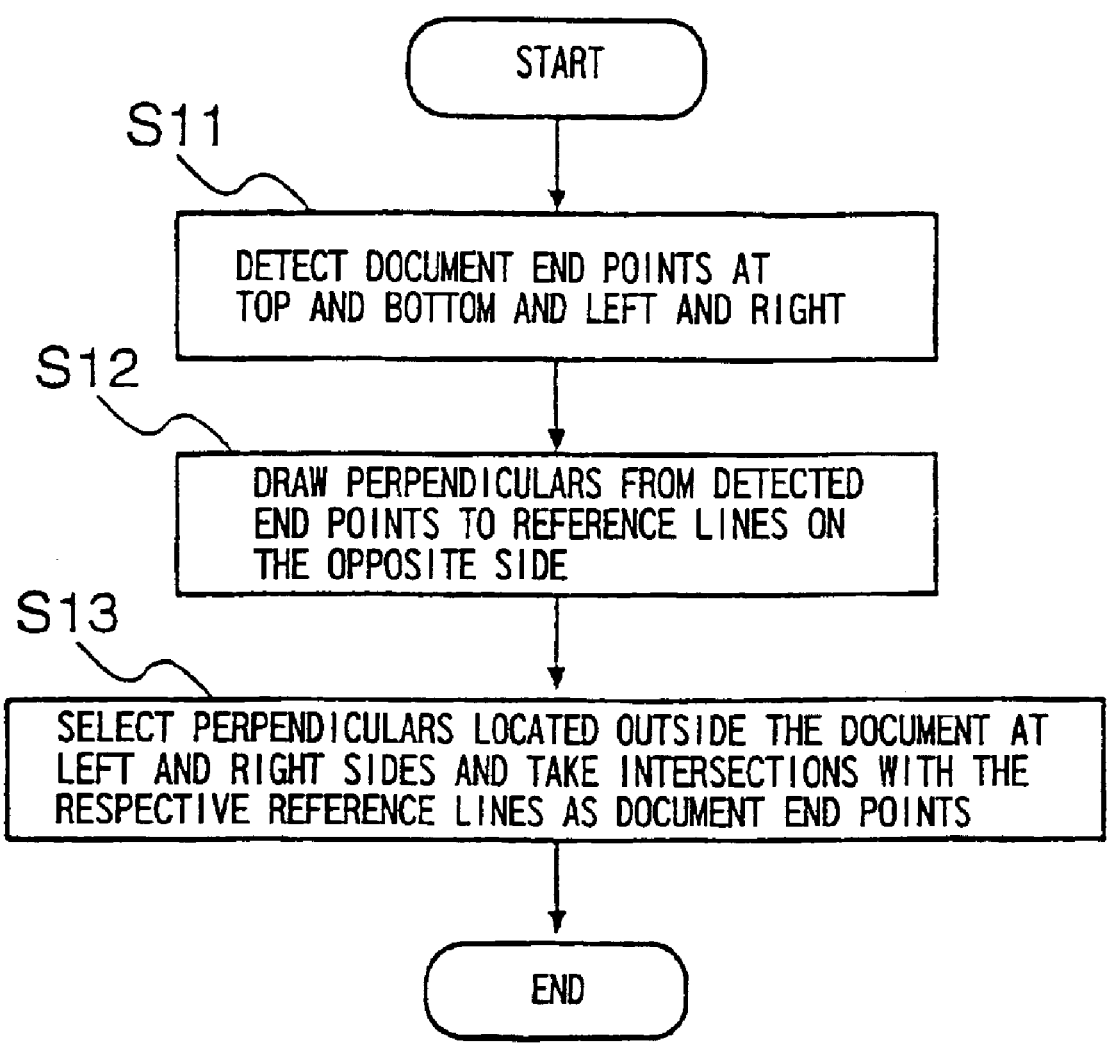
FIG. 7 is a flow chart illustrating an operating procedure for document end point detection means.

Next, document end point detection means will be described with reference to FIG. 7. In the portion contacting the glass surface, the luminance of the document surface is considered to be substantially constant, but outside the document the luminance drops because the distance from the light source of the scanner, etc. increases. As in FIG. 6, the change of the pixel value near the edge is obtained at both the top and bottom of the document, the pixel value is compared with the maximum value of the pixel value on both the left and right pages, and positions where the pixel value decreases by more than a predetermined amount are detected (S11).

Figure 8:
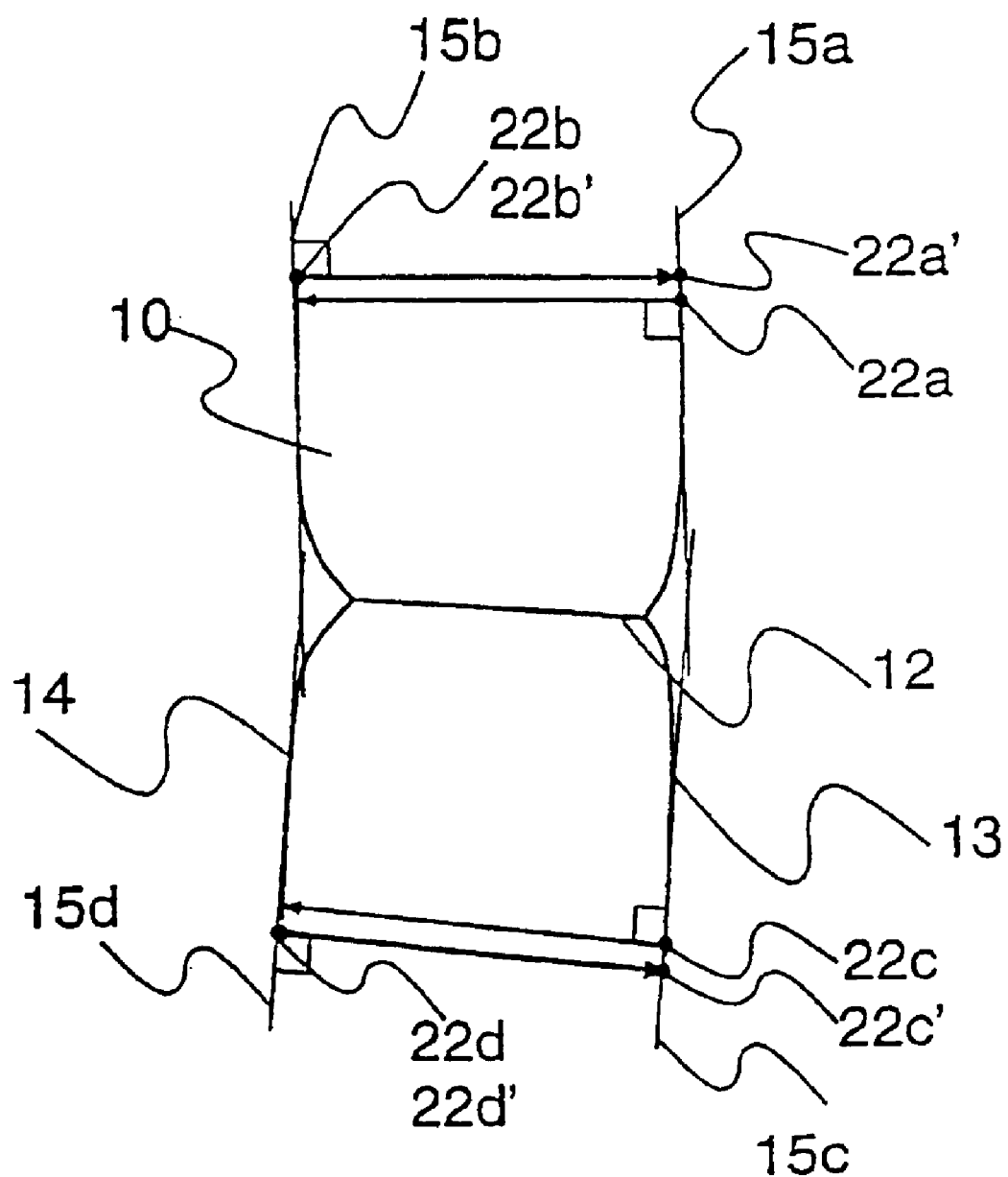
FIG. 8 is a diagram for explaining the document end point detection means.

Generally, since the light source of a scanner, copying machine, etc. illuminates a document from an oblique direction, not from directly below it, the incidence angle of the light differs between the left and right sides of the document, and this may cause a difference in luminance when projected as an image. Accordingly, different criteria may be used between the left and right pages of the document; for example, when the pixel value has dropped by 3% in the case of the left page of the document or by 5% in the case of the right page, it is determined that a document end point has been detected. As shown in FIG. 8, from the detected end points 22*a*, 22*b*, 22*c*, and 22*d*, perpendiculars are drawn to the upper or lower reference lines, respectively, on the opposite side (S12); then, the perpendiculars located outside the document are selected on the left and right sides, and the points of intersection with the respective reference lines are newly taken as document end points 22*a*', 22*b*', 22*c*', and 22*d*' (S13). In this embodiment, the perpendiculars located outside the document are selected to avoid cutting off necessary portions, but perpendiculars located inside may be selected in order to cut as many unnecessary portions as possible.

Figure 9:
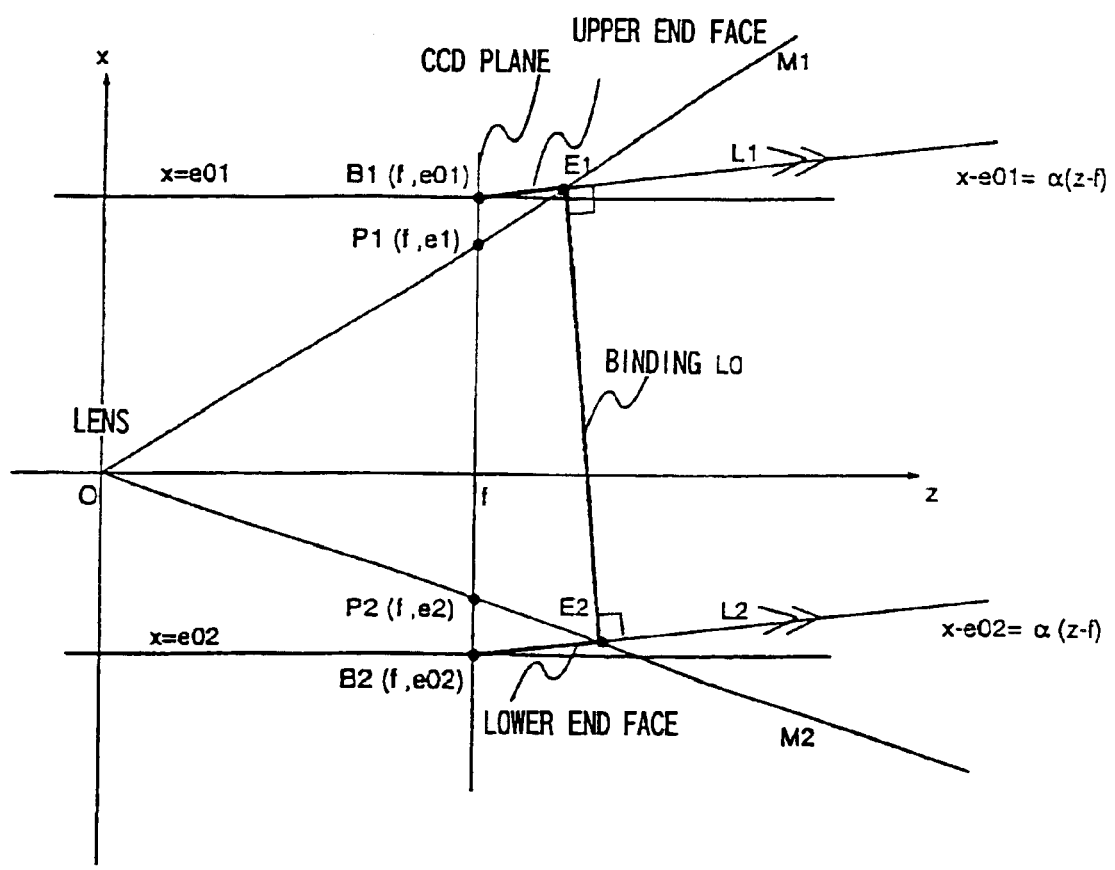
FIG. 9 is a diagram for explaining side slope angle computing means.

Next, side slope angle computing means will be described with reference to FIG. 9. FIG. 9 shows the relationship between the lens and the document image; the document image is shown as viewed from the y-axis direction and rotated through 90 degrees. In the figure, z axis is set perpendicular to the CCD plane and the glass surface, and the lens center is set at the origin O. The distance from the lens to the CCD plane is denoted by f. The portion above the origin is shown pressed down, which means that the binding slopes down toward the upper side of the document. Solid lines in the figure show the document image projected through the lens. The upper and lower end points E1 and E2 of the binding are reduced on the CCD and appear to be located at positions P1 and P2. This shows that when a book is scanned by a scanner, the image of the lifted portion is reduced.

Here, lines passing through E1 and E2 and perpendicular to the binding L0 are denoted by L1 and L2, respectively. Since a document such as a book is a rectangular sheet of paper bound along one side thereof, the binding can be considered to be at right angles with the upper and lower side faces. It is therefore assumed that the straight lines L1 and L2 respectively coincide with the upper side face and lower side face of the document.

It is also assumed that the points B1 and B2 where the respective lines L1 and L2 intersect the CCD plane lie on the reference lines of the respective edges. At this time, the slope α of the side face of the document is computed in the following manner. It is assumed here that the upper and lower ends of the binding are projected at the points P1 and P2, respectively, on the CCD. At this time, the images of the upper and lower ends of the binding lie on straight lines M1 and M2, respectively, and are located at the points E1 and E2, respectively, where the straight line L0 intersects with L1 and L2.

First, the intersection E1 between L1 and M1 is found. The straight lines L1 and M1 are expressed respectively as $$x = \alpha(z-f) + e_{01} \tag{1}$$

$$x = \frac{e_1}{f} z \tag{2}$$

From equations (1) and (2), the intersection E1 between L1 and M1 is $$\begin{cases} z = \dfrac{f(e_{01} - \alpha f)}{e_1 - \alpha f} \\ x = \dfrac{e_1(e_{01} - \alpha f)}{e_1 - \alpha f} \end{cases} \tag{3}$$

Next, the intersection E2 between L2 and M2 is found. The straight lines L2 and M2 are expressed respectively as $$x = \alpha(z-f) + e_{02} \tag{4}$$

$$x = \frac{e_2}{f} z \tag{5}$$

From equations (4) and (5), the intersection E2 between L2 and M2 is $$\begin{cases} z = \dfrac{f(e_{02} - \alpha f)}{e_2 - \alpha f} \\ x = \dfrac{e_2(e_{02} - \alpha f)}{e_2 - \alpha f} \end{cases} \tag{6}$$

From equations (3) and (6), the direction vector of the straight line L0 is $$\begin{pmatrix} (e_{01} - e_{02} + e_2 - e_1)\alpha f^2 - (e_{01}e_2 - e_{02}e_1)f \\ (e_2 - e_1)f^2\alpha^2 - (e_{02}e_2 - e_{01}e_1)f\alpha + (e_{02} - e_{01})e_1 e_2 \end{pmatrix} \tag{7}$$

and from the condition that the straight line L0 intersects at right angles with L1 and L2, the following equation is given.

$$(1 \;\; \alpha) \cdot \begin{pmatrix} (e_{01} - e_{02} + e_2 - e_1)\alpha f^2 - (e_{01}e_2 - e_{02}e_1)f \\ (e_2 - e_1)f^2\alpha^2 - (e_{02}e_2 - e_{01}e_1)f\alpha + (e_{02} - e_{01})e_1 e_2 \end{pmatrix} = 0 \tag{8}$$

Simplifying this, a cubic equation for a is obtained, which is given as $$(e_2-e_1)f^2\alpha^3+(e_{01}e_1-e_{02}e_2)f\alpha^2+\{(e_{02}-e_{01})e_1e_2+(e_{01}-e_{02}+e_2-e_1)f^2\}\alpha+(e_{02}e_1+e_{01}e_2)f=0 \qquad (9)$$

and the solution of this equation gives the slope $\alpha$ of the side face to be found. Generally, it is difficult to solve a cubic equation; in actuality, however, since the slope of the side face is nearly parallel to the z axis, and since it is known, from the ratio of the distance of B1, P1 to the distance of B2, P2 from the z axis, on which side, the upper side or lower side, the binding is pressed further down, an approximate solution can be determined. If an approximate solution is known in advance, an approximate root can be easily found by iteration using a bisection method or the like.

Next, three-dimensional edge position computing means will be described. The equations (3) and (6) used in the side slope angle computing means to obtain the slopes a of the upper and lower side faces of the document can be applied not only for the upper and lower end points of the binding but also for the entire edge.

By applying the lens to CCD distance f, the position of the reference line, the position of the edge imaged on the CCD, and the slope $\alpha$ of the upper/lower side face of the document to the equations (3) and (6), the x and z coordinate values of the edge can be found. In the case of the input device such as a scanner, since the image is captured by scanning with the CCD and lens, the projection is a parallel projection along the y direction, so that the y coordinate of the edge imaged on the CCD coincides with the y coordinate of the projected image and there is no need to calculate the y coordinate. Therefore, by using this y coordinate along with the above obtained x and z coordinates, the three-dimensional position of the edge image can be found.

Figure 10:
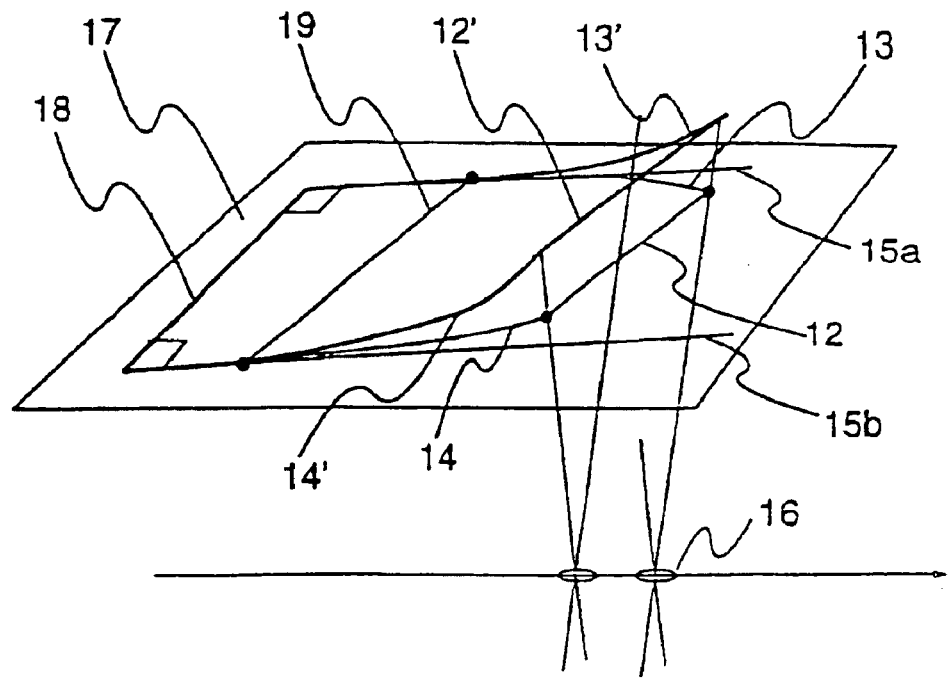
FIG. 10 is a diagram for explaining document shape computing means.

Next, document shape computing means will be described with reference to FIGS. 10 and 11. FIG. 10 shows the image of the document (only the left page is shown) projected through the lens 16. The portion of the document contacting the glass surface is projected on the CCD plane 17, but the portion lifted away from the glass surface is projected beyond the CCD plane. The binding, the upper edge, and the lower edge correspond to 12', 13', and 14', and in the image projected on the CCD, these appear to be located at positions 12, 13, and 14, respectively. Since the positions of the binding 12', the upper edge 13', the lower edge 14', and the document left side end 18 are already found by the three-dimensional edge position computing means, the position of the document surface defined by them is now determined. If the three-dimensional coordinates at any given position in the image of the document surface are found, correspondence to the image projected on the CCD can be easily established from the positional relationship between the lens and the CCD, and the image can thus be corrected so that it appears flat.

Figure 11:
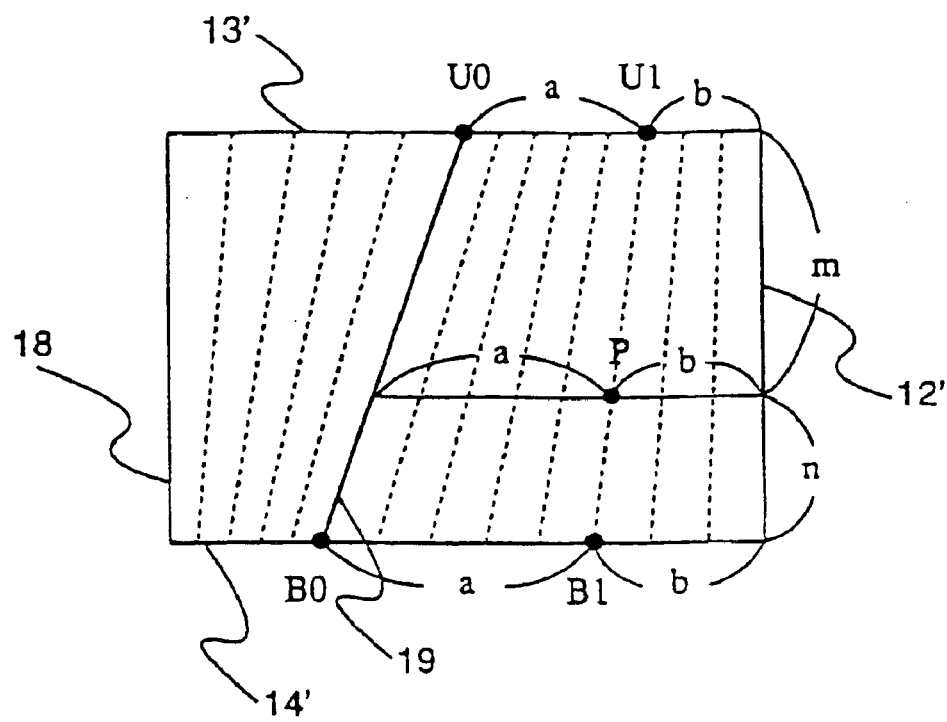
FIG. 11 is a diagram for explaining the document shape computing means, showing a projected image converted back to a two-dimensional plane.

FIG. 11 is a diagram showing the projected image converted back to a two-dimensional plane. If the document shape is rectangular, it goes without saying the projected image converted back to the two-dimensional plane is also rectangular in shape. In FIG. 11, the upper side of the rectangle corresponds to the upper edge 13', and the lower side to the lower edge 14'. However, since the computed edge length may differ due to measurement errors, etc., the length must be matched to either the upper edge or the lower edge. For example, if the lower edge 14' is shorter than the upper edge 13', first the upper edge 13' is mapped to the upper side of the rectangle, and then by extending the corresponding portion of the lower side of the rectangle, the lower edge 14' is made to match the lower side of the rectangle.

Likewise, the length of the left/right side of the rectangle, i.e., the height of the page after correction, is made to match the distance between the upper and lower edge reference lines of the document. However, since the distance between the upper and lower reference lines of the document may differ due to measurement errors, etc., the distance is matched to the average value between the left and right pages. Alternatively, the distance may be matched to one or the other.

The portion where the document surface beings to lift off the glass surface will be referred to as a lift-off line 19. The lift-off line is assumed to be a straight line. Since the lifted portion of the document surface is constrained by two straight lines, i.e., the lift-off line 19 and the binding 12', the document surface can be considered to be a set of straight lines whose slope continuously varies from the lift-off line 19 toward the binding 12'. In the present embodiment, it is assumed that each of these straight lines lies at a position that divides the lift-off straight line 19 and the binding 12' in a given ratio, but other model may be used. The straight line dividing them in a given ratio corresponds to a broken line in FIG. 11, and is considered to be a set of dots at which the dividing ratio in the horizontal direction is the same. For the portion between the document left side end 18 and the lift-off line 19, such modeling is not necessary because that portion lies flat, but in order that the same processing as that for the curved portion can be applied, the portion between the document left side end 18 and the lift-off line 19 is also considered to be a set of straight lines each dividing them in a given ratio.

Figure 12:
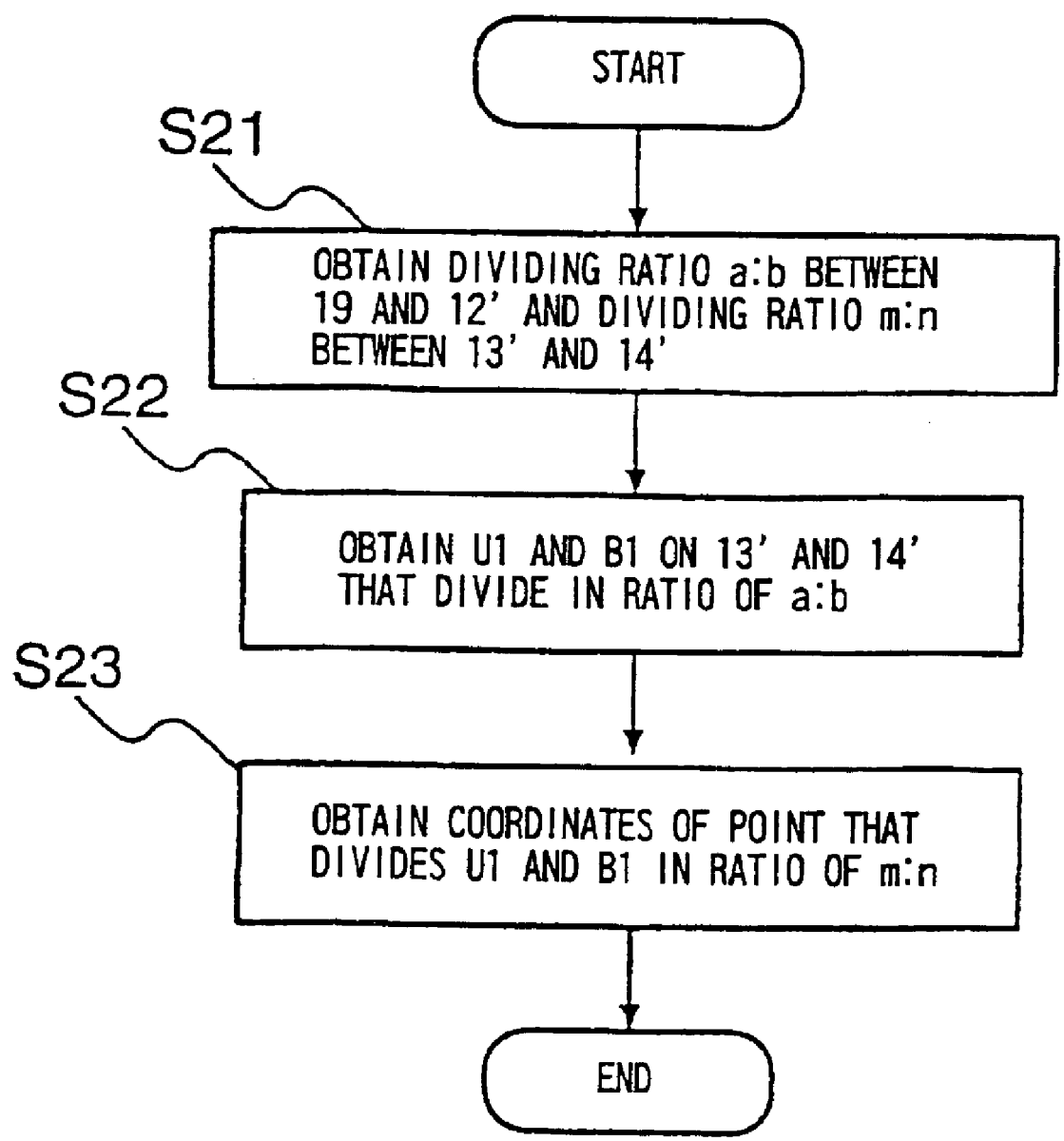
FIG. 12 is a flow chart illustrating a method of obtaining the three-dimensional coordinates of a point P on the document surface.

FIG. 12 shows a flow chart illustrating how the three-dimensional coordinates of a point P on the document surface are obtained. First, the dividing ratio m:n between 13' and 14' at the point P and the dividing ratio a:b between 19 and 12' at the point P are obtained (S21). Point U1 that divides between 19 and 12' on 13' in the ratio of a:b and point B1 that divides between 19 and 12' on 14' in the ratio of a:b are obtained (S22). Since the three-dimensional coordinates on the upper edge 13' and lower edge 14' are already obtained by the three-dimensional edge position computing means, the coordinates of U1 and B1 are known. Since the document surface between U1 and B1 is assumed to be a straight line, the point that divides the straight line in the ratio of m:n is the point P. In this way, the three-dimensional position of any given point on the document surface, that is, the three-dimensional shape of the document surface, can be obtained.

Figure 13:
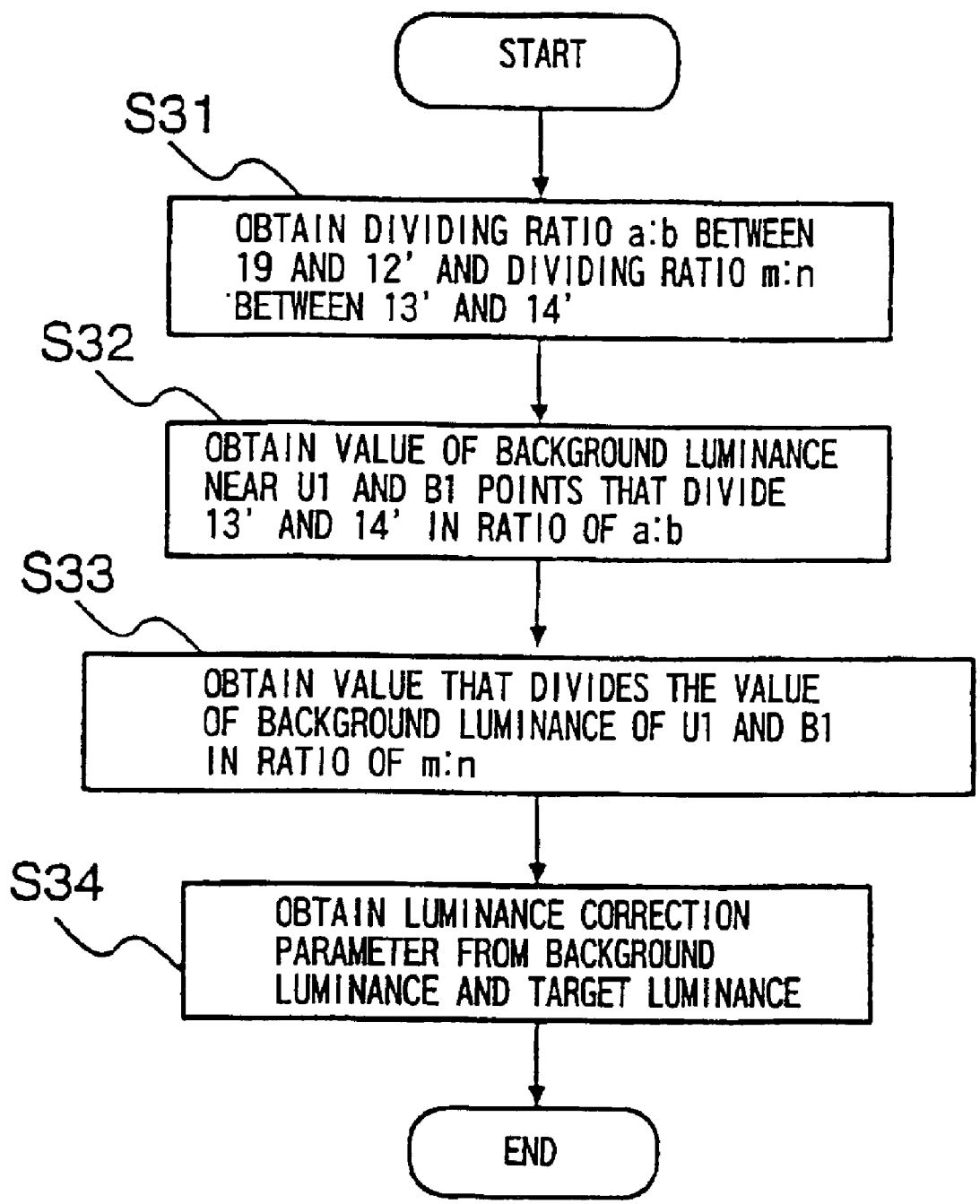
FIG. 13 is a flow chart for explaining luminance correction parameter computing means.
Figure 14:
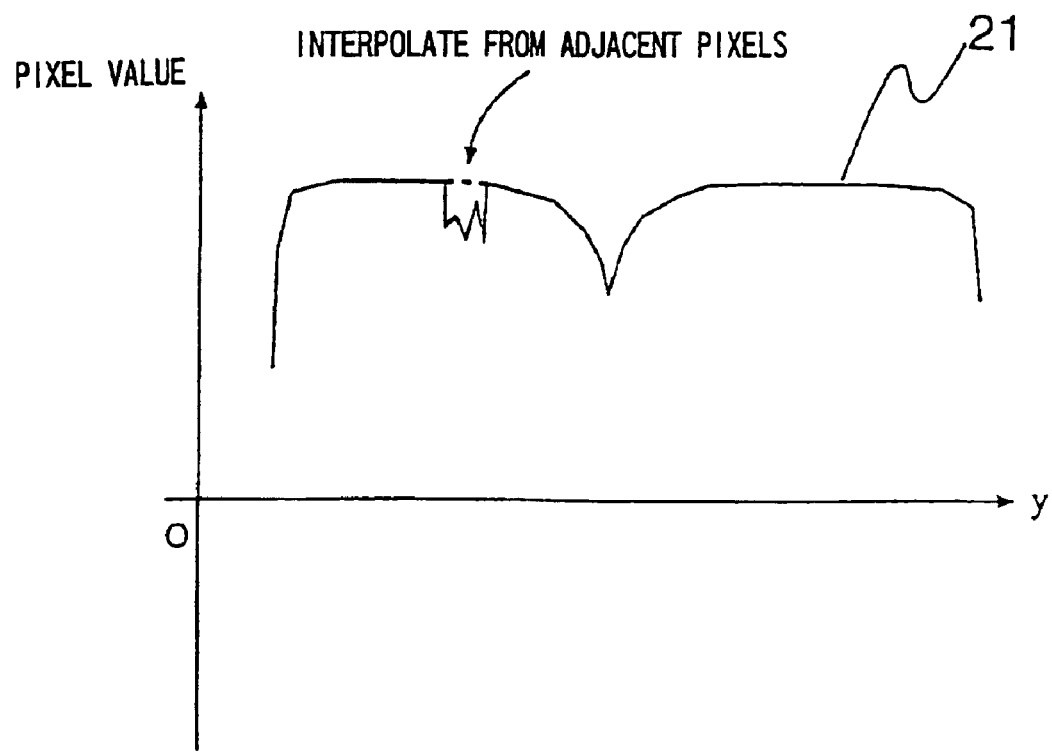
FIG. 14 is a graph showing background luminance near an edge.

Luminance correction parameter computing means will be described with reference to FIG. 13. As with the document shape computing means described above, the dividing ratio a:b between 19 and 12' and the dividing ratio m:n between 13' and 14' are obtained at the attention point P (S31). Points U1 and B1 that divide in the ratio a:b on 13' and 14', respectively, are obtained, and the value of the background luminance of the document on the CCD at each of U1 and B1 is obtained (S32). For a document such as a book, the portion near the edge can generally be considered a blank space; therefore, the pixel value near the edge should be taken as representing the background luminance. The pixel value near the edge may be represented by the value of a pixel located at a given distance from the edge or by the average value of pixels located within a predetermined range. However, since there are cases where letters or drawings are written near the edge, the pixel value near the edge is examined in advance, and any portion where the pixel value changes abruptly, as shown in FIG. 14, is interpolated from the pixel values before and after it. Assuming that the background luminance changes linearly from U1 to B1, the value that divides the background luminance value of U1 and B1 in the ratio of m:n is taken as the background luminance at P (S33). From the background luminance and target luminance, a luminance correction parameter is obtained (S34). Denoting the target luminance as Bg, and the background luminance as Bb, the luminance correction parameter Br is obtained as shown by equation (10).

$$Br=Bg/Bb \qquad (10)$$

The target luminance may be set as the maximum value of the background luminance of the entire image, or a sufficiently bright pixel value, or the maximum possible value that the pixel value can take. Let Iin denote the pixel value before correction, and Iout the pixel value after correction; then, using the luminance correction parameter Br, the luminance correction can be made as shown by equation (11).

In the present embodiment, image correction means performs the luminance correction simultaneously with distortion correction.

$$Iout=BrIin \qquad (11)$$

Actually, since the pixel value takes a value within a finite range, for example, from 0 to 255, the equation (11) is constructed to saturate at the maximum value. Further, if an image having a dark portion near the binding is corrected using the equation (11), the text portion may become too light and may appear washed out; therefore, provisions may be made to change the correction parameter for pixels of values lower than a predetermined value, or not to apply correction for such pixels.

Next, the image correction means will be described. In FIG. 11, if the pixel value at any given point P on the document surface is obtained, an image containing distortion can be corrected as if the document surface were flat. The three-dimensional shape of the document surface is already found by the document shape computing means.

Figure 15:
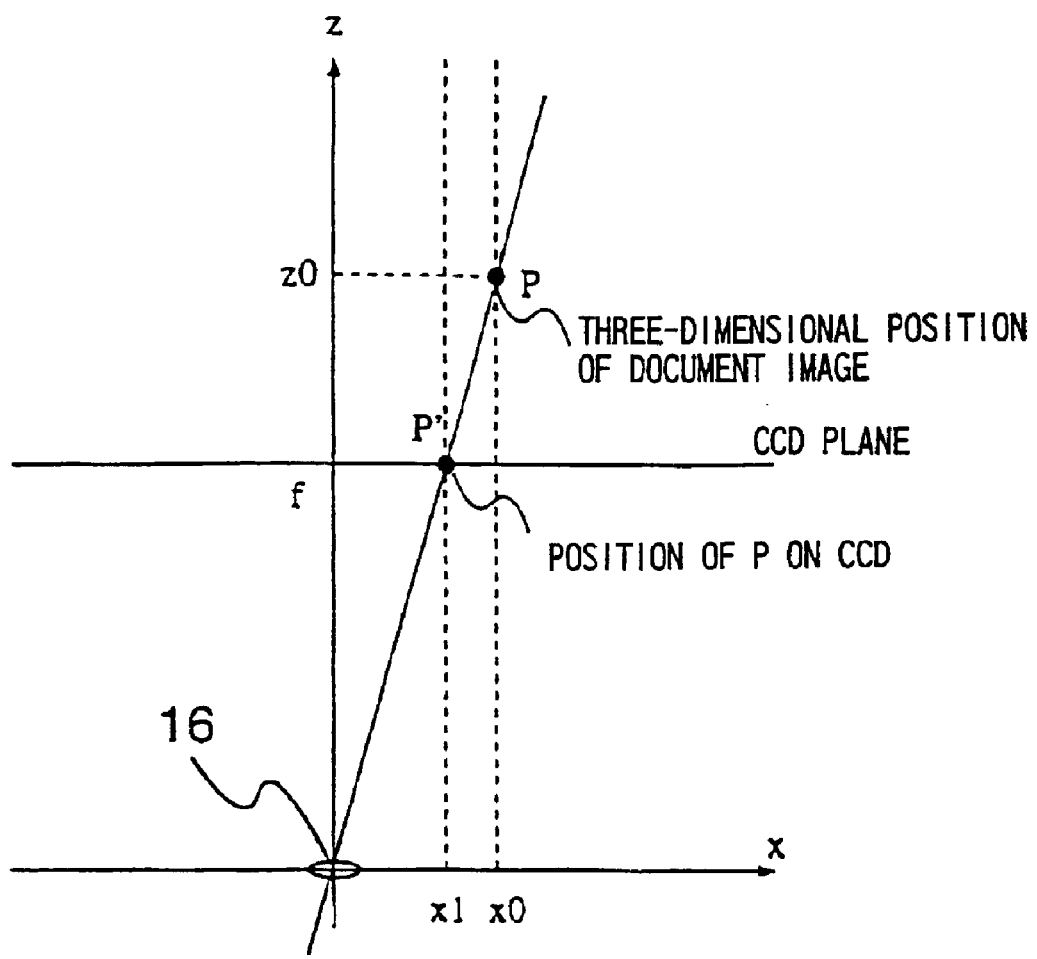
FIG. 15 is a diagram for explaining a method of how reference position P' of an image projected on a CCD is obtained from the three-dimensional position P of an image of the document surface for image correction.

A method of how reference position P' of the image projected on the CCD is obtained from the three-dimensional position P of the image of the document surface will be described with reference to FIG. 15. Denoting the three-dimensional position on the document surface by P(x0, y0, z0), and the position of P projected on the CCD by P'(x1, y1, z1), P' can be obtained as shown by equation (12) from the similarity of triangles.

$$\begin{cases} x1 = \dfrac{x0 f}{z0} \\ y1 = y0 \\ z1 = f \end{cases} \qquad (12)$$

wherein f is the distance between the lens and the CCD. In the case of a scanner or a copying machine, since the image is captured by scanning with the lens and CCD, the projection is a parallel projection along the y direction in which the lens moves, and therefore, the y coordinate of the document image is the same as that on the CCD plane.

As described above, the coordinates of the image to be referenced as well as the pixel value can be obtained at any given position on the document surface. By obtaining reference pixels in sequence starting from one end of the document surface, and by outputting the reference pixels, the image can be corrected not only for distortion but also for skew. In the image correction means, when outputting the pixel value, the luminance correction is simultaneously performed using the equation (11). In the present embodiment, the correction parameter and the reference pixel coordinates in the image are obtained on a pixel by pixel basis; alternatively, the image may be divided in the form of a lattice, and the correction parameter and reference coordinates may be obtained for each lattice point, in which case the corresponding values for other portions are interpolated from the obtained values.

Next, image output means will be described. In the image correction apparatus of the present embodiment, the three-dimensional shape of the document surface is obtained using the document shape computing means, and corrections are applied using the image correction means by mapping only the document surface to the captured image. Accordingly, only the image enclosed by the left and right ends and the upper and lower edges of the document is corrected, and unnecessary portions other than the document surface are not corrected. By only outputting the thus corrected image, the image output means can output the image from which unnecessary portions other than the document surface have been removed. Furthermore, since the size of the document surface after correction is known, if the image is output on an optimum sheet that matches the size of the image, the user need not select paper and a printout can be produced without wasting paper.

Further, since the binding position on the document is already found using the binding position detection means, the left and right pages can be output separately by dividing the output at the binding position. Therefore, the left and right pages need not be scanned separately, but can be scanned at once and output on different sheets of paper.

Also, since there are cases where the shade near the binding cannot be removed completely if luminance correction is applied by the image correction means, when outputting an image near the binding the image may be output after converting it to white data. Alternatively, considering the case where the document is not white, the image may be converted, not to white data, but to a pixel value outside the binding.

[Embodiment 2]

The second embodiment hereinafter described differs from the first embodiment in that image reducing means is added, and in that the document shape computing means used is different. In the present embodiment, the image reducing means and the document shape computing means are both implemented as programs run on the central processing unit 2, but each of these means may be implemented in hardware logic. The image reducing means takes an average over a plurality of pixels in an input image, and outputs it as one pixel. Alternatively, this can be accomplished by decimating pixels for output. In the first embodiment, the document shape is obtained from the input image, but since the resolution of an input image to a copying machine, etc. is very high, for example, 400 dpi or 600 dpi, if the document shape is to be obtained from such a high resolution image, there arises the problem that it takes a very large amount of memory and considerable computation time. If the image is reduced to 1/4, the amount of data is reduced to 1/16, and image processing can be performed with less memory and at higher speed.

Next, the document shape computing means will be described. The document computing means is the same as that in the first embodiment up to the point where the three-dimensional shape of the document is computed. Since the three-dimensional shape data of the document is data obtained from the reduced image, and since image correction must be applied to the input image, not to the reduced image, the three-dimensional shape data of the document must first be corrected.

If the image reduction ratio is 1/4, for example, the data correction can be accomplished by magnifying the three-dimensional shape data of the image by a factor of 4. Further, the necessary memory amount can be reduced by inputting the image twice, first when checking the document shape and then when applying image correction.

If all processing operations are to be performed by inputting the image only once, the entire image must be held in the memory, but by inputting the image twice, the memory need only have a capacity just enough to hold the reduced image when recognizing the shape and, in the image correction process, since correction can be applied while inputting the image, the processing can be performed by storing only a portion of the image in the memory.

[Embodiment 3]

The third embodiment described hereinafter differs from the first embodiment by the inclusion of selecting means for making a selection as to whether image correction is to be performed or not, so that the input characteristics can be changed for the image to be input. The selecting means may be implemented as a selection menu in software or as a hardware switch. For example, when performing correction, the input image is corrected before being output, and when not performing correction, the input image is output as is. In an ordinary copying machine, the input characteristics are adjusted so that black characters appear black and white background appears white; on the other hand, in the image correction apparatus of the present invention, since document edges need to be detected, if images near the binding blacken, edges cannot be detected correctly. When performing distortion correction, if the image is input a little light, images near the binding do not blacken and edges can be detected correctly. By also applying luminance correction when performing distortion correction, the luminance of the image can be corrected to match the actual document.

As described above, by switching the input characteristics according to whether correction is to be performed or not, optimum images according to the respective situations can be obtained, and distortion correction can also be performed correctly.

[Embodiment 4]

The fourth embodiment hereinafter described differs from the first embodiment by the inclusion of document region detection means. The document region detection means will be described with reference to FIG. 16.

Figure 16:
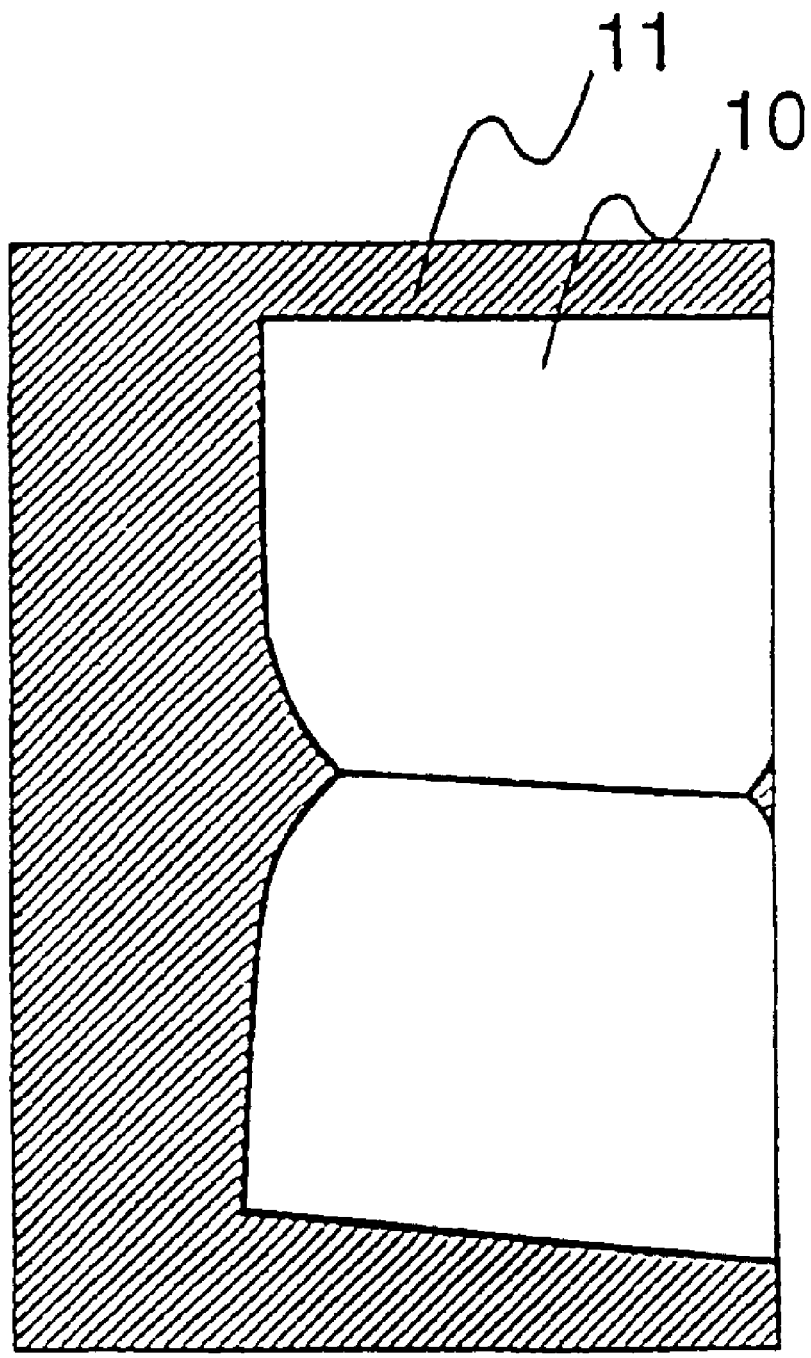
FIG. 16 is a diagram for explaining document region detection means.

FIG. 16 shows that the document 10 lies running over an edge of the image region. For example, when a light document with a background of white or like color is captured by a scanner, since the pixel value of the document region is large, a region where the pixel value is larger than a predetermined value is detected from the image. If the range of that region touches an outer edge of the image, then it can be determined that the document lies running over the edge of the image region.

If the document lies running over the edge of the image region, distortion correction cannot be performed because the upper and lower edges of the document cannot be detected correctly. Therefore, provision is made not to perform distortion correction when an out of position condition of the document is detected. In the present embodiment, the document region is detected from the image, but a separate sensor may be provided and the document position may be detected using the sensor. Further, if the left or right side of the document lies off the image region, no significant effect will be caused to shape recognition; therefore, provision may be made to ignore an out of position condition on the left and right sides, and to detect an out of position condition only on the upper and lower sides.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

Potential for Exploitation in Industry

According to the present invention, by correcting for distortion and shade that occur when a book or magazine page is read by a scanner or a copying machine, the image can be corrected as if the document were flat. Furthermore, even if the amount of lift at the binding of the document differs between the top and bottom of the document, or even if the document is rotated, image correction can be accomplished.

Furthermore, according to the present invention, not only are isolated points identified on the basis of the length of the connected component of the image after edge detection, but in a portion where the change of edge position is small, a segment longer than a predetermined length is detected as the edge position, and an undetected segment is interpolated from the detected segments before and after it; this ensures stable edge detection by eliminating edge detection errors or omissions.

According to the present invention, since, of maximum or minimum points of the edge position, the points nearest to the center of the image are taken as representing the binding, the binding position can be detected stably without being affected by minor local variations of the shape.

According to the present invention, since, of segments where the amount of change of the edge slope is less than a reference value, the average edge slope in the longest segment is taken as the slope of the reference line, the slope of the reference line can be detected accurately from among document edges where the slope varies continuously.

According to the present invention, since document end points are detected using different criteria between the left and right pages of the document, the end points of the left and right pages can be optimally detected in a scanner or a copying machine in which light is usually projected in an oblique direction.

According to the present invention, by approximating the document surface by a set of straight lines whose slope varies continuously, a correction parameter for the document shape at any given point on the document surface can be easily obtained from a dividing ratio.

According to the present invention, if the computed edge length of the document differs between the top and bottom of the document, data is corrected to adjust the length to match the length of either the top or bottom edge; this contributes to making the corrected image appear more natural than if the image were corrected without adjusting the length.

According to the present invention, if the computed vertical length of the document differs between the left and right sides of the document, data is corrected to adjust the length to match the length of either the left or right side; this serves to maintain balance between the left and right, and contributes to making the corrected image appear more natural.

According to the present invention, since shape recognition is performed using an image obtained by reducing the captured image, processing burden can be drastically reduced compared with the case where shape recognition is performed by directly using the image captured at high resolution.

According to the present invention, by approximating the document surface by a set of straight lines whose slope varies continuously, a correction parameter for luminance at any given point on the document surface can be easily obtained from a dividing ratio.

According to the present invention, by converting images near the binding into blank images for output, portions where the images cannot be completely corrected can be made less noticeable. Furthermore, by converting images near the binding into a pixel value at a position distanced from the binding, and outputting such converted images, if the document color is not white, images near the binding can be erased with a color that matches the document.

According to the present invention, by dividing image reading between image reading for shape recognition and image reading for image correction, the required memory amount can be reduced-drastically.

According to the present invention, by performing image reading by using different input characteristics when correcting for image distortion than when not correcting for image distortion, the image can be read with high white/black contrast when distortion correction is not performed, while the image can be input in such a manner as to facilitate the detection of edge shape when distortion correction is performed.

According to the present invention, by not performing correction when the document is placed running over an image, wastage of paper can be avoided.

What is claimed is:

1. An image correction apparatus for correcting an image of a document with a binding portion lifted differently between the top and the bottom of the document, comprising:

edge detection means for detecting edges of the document;

binding position detection means for obtaining a binding position of the document;

reference line detection means for obtaining a reference line for the position of the document;

side slope angle computing means for computing slope angles of the top and bottom sides of the document on the basis of the reference line and the binding position;

three-dimensional edge position computing means for computing three-dimensional positions of upper and lower edges of the document on the basis of the edges and the slope angles; and document shape computing means for computing a shape of a whole of the document on the basis of the three-dimensional positions of the edges.

2. The image correcting apparatus of claim 1, further comprising document end point detection means for obtaining left and right end points of the document on the basis of variations in image luminance near the edges; and luminance correction parameter computing means for obtaining background luminance of a correction target pixel from the image on the basis of the three-dimensional shape of the document and obtaining a luminance correction parameter for the pixel on the basis of the background luminance and target luminance, wherein an input image is corrected using the luminance correction parameter and the three-dimensional shape of the document.

3. The image correction apparatus of claim 1, wherein, from an area where a change of edge position is small, the edge detection means detects segments longer than a predetermined length and, for any other portion than the detected segments, a position interpolated from segments detected before and after that portion is taken is taken as a position of a document edge.

4. The image correction apparatus of claim 1, wherein, of maximum or minimum points of positions of edges detected by the edge detection means, the binding position detection means detects those nearest to a center of the image as representing the binding position.

5. The image correction apparatus of claim 1, wherein, of segments where a pixel value of an image near each edge is larger than a first reference value and where an amount of change of edge slope is smaller than a second reference value, the reference line detection means detects an average edge slope in the longest segment as a slope of the reference line, and takes a straight line, extended from an end point outside the document along the longest segment with the thus detected slope, as the reference line, the reference line being detected for each of the left and right edges or the upper and lower edges of the document.

6. The image correction apparatus of claim 1, wherein the document end point detection means detects the end points of the document, based on different criteria between left and right pages of the document.

7. The image correction apparatus of claim 1, wherein the document shape computing means approximates a document surface by a set of straight lines connecting between the lower and upper edges, and obtains a three-dimensional position of the document surface on the basis of a dividing ratio in which the positions of the upper and lower end points of the straight lines are divided.

8. The image correction apparatus of claim 1, wherein, when computed edge lengths of the upper and lower edges differ from each other, the document shape computing means corrects the three-dimensional positions of the edges so that the lengths become equal to each other.

9. The image correction apparatus of claim 1, wherein, when computed vertical lengths of the left and right pages differ from each other, the document shape computing means corrects three-dimensional shape data of the document so that the vertical lengths become equal to each other.

10. The image correction apparatus of claim 1, wherein, the document shape computing means includes image reducing means for reducing an input image in accordance with a predetermined reduction ratio and, after obtaining the three-dimensional shape of the document from a reduced image, corrects the three-dimensional shape data of the document in accordance with the reduction ratio.

11. The image correction apparatus of claim 7, wherein a luminance correction parameter computing means obtains a background luminance of a correction target pixel on the basis of a dividing ratio of an image luminance near upper and lower points of straight lines which are used to approximate the document surface, and takes the ratio of a target luminance to the background luminance as a luminance correction parameter.

12. The image correction apparatus of claim 1, wherein a pixel value near the binding position is converted to blank space, and a converted pixel value is outputted.

13. The image correction apparatus of claim 1, wherein a pixel near the binding position is converted to a pixel value at a position distanced from the binding position, and a converted pixel value is outputted.

14. The image correction apparatus of claim 1, wherein image reading for producing a reduced image is performed separately from image reading for reading a correction target pixel.

15. The image correction apparatus of claim 1, further comprising:
  correction selecting means for making a selection as to whether image correction is applied or not; and
  image input means for inputting an image by using input characteristics which vary depending upon whether image correction is carried out or not.

16. The image correcting apparatus of claim 1, further comprising:
  document region detection means for detecting a document region from an input image,
  wherein when the document region runs over the image, image correction is not carried out.

* * * * *